Patented June 2, 1953

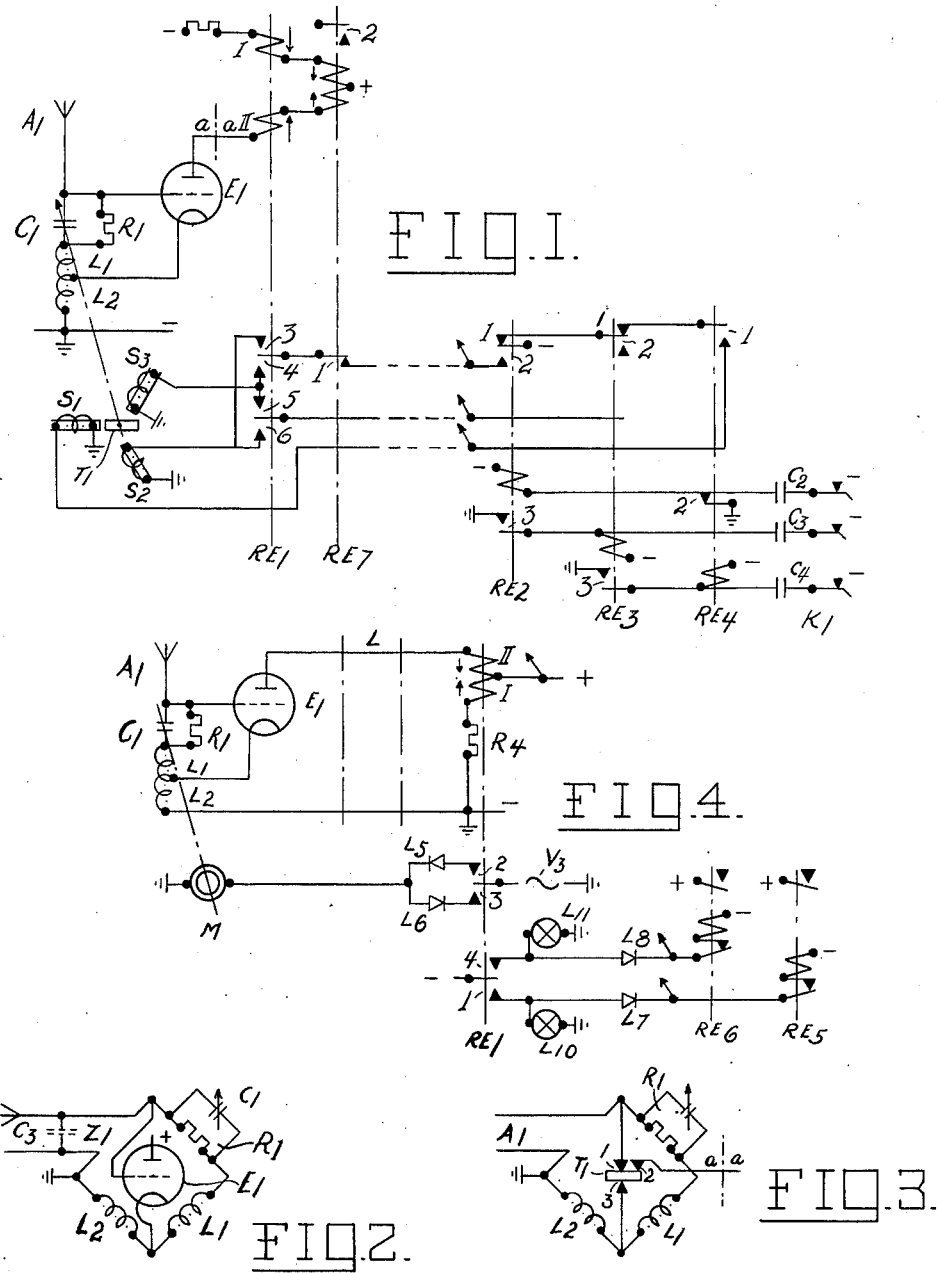

2,640,978

UNITED STATES PATENT OFFICE 2,640,978

CAPACITY ACTUATED BURGLAR ALARM

Per Harry Elias Claesson, Jakobsberg, and Karl Lennart Johansson, Grondal, Sweden Application October 20, 1950, Serial No. 191,154
In Sweden October 22, 1949

5 Claims. (Cl. 340—258)

This invention relates to guarding or alarm systems for detecting the presence of burglars or other unauthorized persons. More specially the invention relates to a capacity actuated alarm system wherein an antenna device is fed with high frequency current and the antenna field is disturbed by the entrance of an object within the field of the antenna.

In such apparatus, undesirable variations of current sometimes occur, such variations being slow compared with the type of variation which occurs by the entrance of an object within the field of the antenna. The slow variations may be caused by variations of temperature, humidity, aging of components particularly in the antenna device, parts of the apparatus and so forth, with the result that the effective values of the components may be changed. In the case of bridge circuits or circuits using amplifier valves, it will be clear that erroneous measurements or indications may consequently be given.

According to the present invention, measuring or indicating apparatus sensitive to capacity variations in the antenna field is provided with regulating devices for automatic compensation of gradual deviations from the normal current values in the apparatus, the correction being effected slowly in comparison with relatively rapid variations which occur at instants of measurement. A fundamental advantage of the invention is that the said regulating device comprises switching means for changing the regulating speed for testing or adjustment from a slow value during guarding to a rapid speed before or after the guarding condition. This switching is preferably made manually.

The invention is particularly applicable to guarding or alarm systems using comparing circuits, as for instance balanced bridges, connected to amplifiers in order to obtain great sensitivity. The impedances forming part of the bridge circuit may be automatically regulate to obtain a predetermined condition of balance in accordance with the invention.

In the application of the invention it is not necessary for an amplifier connected to a measuring device, for example to the output of a bridge (zero tapping), to have an operating range so large that it may be extended to include even the undesirable variations, but only those variations which are required for the measurement.

The invention will be described in more detail with reference to the accompanying drawings which show examples of how the invention may be utilised and in which:

Figs. 1 and 2 illustrate the principles of operation of measuring devices which include a bridge coupling, Fig. 3 shows a correcting device using transistors as amplifiers, Fig. 4 shows the various components forming a complete unit.

Fig. 1 shows a device for measuring small capacity variations, especially in alarm systems. The operation of the measuring device is seen more clearly when Fig. 1 is drawn in the form of a bridge according to Fig. 2.

As will be clear from Fig. 2 the potential difference between the grid and the cathode of the tube $E_1$ is small, if $L_1=L_2$ and $C_1=C_3$ and $R_1=$ the radiation resistance of the antenna $A_1$, so that oscillations do not arise. If $C_1$ is greater than $C_3$ oscillations do not arise either, because oscillations tending to arise between the grid and the cathode are out of phase. When, on the contrary, $C_1$ is less than $C_3$, self-oscillation arises and feeds the antenna. Because of heavy damping on the oscillating circuit, depending chiefly on the resistance $R_1$, the amplitude of oscillation of the tube may be adjusted at will, for example, to half maximum amplitude. This adjustment is made by means of the condenser $C_1$. When the tube is oscillating, it operates also as a grid rectifying detector, i. e. the grid receives a negative potential in relation to the cathode. The size of this voltage is dependent on how high a degree of oscillation the tube reaches. The negative voltage of the grid causes the anode current to fall.

When an object approaches the antenna, the capacitance $C_3$ between the grid of the tube and earth increases and the radiation resistance of the antenna may also be changed, so that the degree of oscillation of the tube decreases, the grid voltage decreases and the anode current increases.

The regulating device comprises a relay $RE_1$ and a step by step motor M in Fig. 1 which is driven in one direction or the other depending on the influence of the reversing control relay $RE_1$. If the current through the relay winding II of relay $RE_1$ in Fig. 1 rises above a predetermined value, the contacts 4 and 6 close, and if the current falls below a predetermined value, the contacts 3 and 5 close. In order to obtain the said functioning of the relay, a polarised relay with a biasing winding I, may be used in the usual way. When the rotor $r_1$ of the motor is rotated in the manner further described below, the condenser $C_1$ is adjusted in such a direction that the value of the current through the operating winding II of the relay $RE_1$ returns to normal, whereupon the contacts of the relay break and the motor stops.

The pulsing driving relays $RE_{2-4}$ release and close successively in the following manner. The positive pole of the battery which supplies the motor M and the relays is indicated as ground on the drawing.

Assuming that all the relays are initially released, the relay $RE_2$ is operated by current from normally closed contact 2 on relay $RE_4$, whereby contact 2 on $RE_2$ is closed, so that winding $S_3$ on the motor receives current if contact 4 on the relay $RE_1$ is closed, and winding $S_2$ is prepared to be supplied with current if contact 6 is made. Subsequently, the relay $RE_3$ is operated by current from contact 3 on $RE_2$, and $RE_4$ by current from contact 3 on $RE_3$.

When $RE_4$ is attracted, its normally closed contact 2 is opened, whereby the relay $RE_2$ releases after a certain time. The releasing times of the three relays $RE_{2-4}$ are heavily delayed by the condensers $C_2-C_4$ respectively. When the relay $RE_2$ releases, one of the motor windings $S_2$ or $S_3$, depending upon the position of relay $RE_1$, will receive current from contact 1 on $RE_2$ and 2 on $RE_2$ with the result that the rotor $r_1$ of the motor is driven forward another step. When the relay $RE_3$ also releases (only $RE_4$ operated) the winding $S_1$ on the motor receives current from contact 1 on $RE_2$, 1 on $RE_3$ and 1 on $RE_4$. The rotor of the motor has thus been rotated through one complete revolution. The relay $RE_4$ then releases, closing its normally closed contacts 2, and the procedure is repeated. Depending on whether contacts 3 and 5 or 4 and 6 of relay $RE_1$ are made, the motor therefore rotates in one direction or the other, and corrects the adjustment of the condenser until normal anode current is obtained in the anode circuit of the tube so that the contacts of the relay $RE_1$ are open.

If rapid correction of the adjustment is desired, for example, if the antenna $A_1$ is altered, the switch $K_1$ is operated, whereby condensers $C_2-C_4$ are disconnected. The pulsing rate of the relays $RE_{2-4}$ is then sensibly increased, for example, to 25 impulses per relay per second. If the speed with the condensers connected is, for example, 1 impulse per relay per 10 seconds, then a speed 250 times greater is obtained with the rapid adjustment. If a certain correction takes 1 hour with the condensers connected, only $$\frac{60}{250}=\frac{6}{25}=\frac{1}{4}$$

minute is required for the same correction with rapid adjustment.

In Fig. 3 the measuring bridge itself is the same as that shown in Figs. 1 and 2, but with this difference that the electronic tube $E_1$ is replaced by a so-called transistor $T_1$ in which 3 is the common electrode, 1 the low potential and 2 the high potential electrode. To the output circuit of the transistor may naturally be connected a relay and/or a motor device of the same types as those described above with reference to Figs. 1 and 2 the lead $a$ of Fig. 3 being connected to the lead $a$ in Fig. 1, instead of the anode of tube $E_1$, thereby controlling the operating winding II or relay $RE_1$. The variable capacitor $C_1$ of Fig. 3 is then connected to be driven by the motor M in Fig. 1.

When the alarm is actuated, as by an intruder, the adjusting device in Figs. 1 and 3 is disconnected by means of a relay $RE_7$, which is connected in the anode or cathode circuit of the tube, for example in series with the relay $RE_1$ which by contact 1 cuts off the current to the motor of the adjusting device. This relay, which may also be provided with contacts 2 for the giving of signals, for example by means of lamps or bells, must not be influenced by the small variations in current in the measuring device caused by the correction.

In Fig. 4 the tube circuit is the same as in Fig. 1 and the relay $RE_1$ has the contacts 1, 2, 3 and 4. The relay is designed so that contacts 2 and 3 are influenced when the current falls or rises in the anode circuit of the tube $E_1$ with a relatively small variation. If contact 2 on $RE_1$ closes, the current passes from the A. C. supply $V_3$ through the rectifier $L_6$ and drives the motor M, and therewith the condenser $C_1$, which is coupled to the motor, in such a direction that the current in the tube again rises until the contact 2 breaks. If, on the contrary, the current in the anode circuit of the tube $E_1$ varies so that the contact 3 on the relay $RE_1$ closes, the motor M receives current in the other direction and corrects the position of the condenser $C_1$ until the contacts open again. An arbitrary correction speed may be chosen for the motor, for example, by making the current supply $V_3$ consist of either positive or negative impulses, since the current supply is made up of so-called A. C. impulses.

If, however, the current in the anode circuit of the tube rises rapidly when an intruder disturbs the antenna field, the contact 1 on the relay $RE_1$ is also influenced. In this case the relay $R_5$, which was locked in through the lamp $L_{10}$, is shunted, and the lamp lights. The winding of the relay must have such a high resistance that the lamp does not light, or only glows dimly, when it receives current only through the winding of the relay. The desired signals are produced by the contacts on the relay. The relay remains released until it is again closed by manual manipulation. The relay $RE_5$ is common to a number of $RE_1$ relays as is shown by the arrow. The rectifier $L_7$ is so connected that current from the contact 1 on $RE_1$ relay cannot light the $L_{10}$ lamps belonging to another $RE_1$ relay. When the relay $R_5$ releases, it can naturally be so arranged as to disconnect the current supply $V_3$ so as to prevent further correction. The relay $RE_1$ may be conveniently locked in the operated position by means of a low resistance winding connected in series with the contact 1 and the connecting point of the lamp $L_1$ and the rectifier $L_7$ (not shown on the drawing).

Naturally the relay $RE_1$ can also be provided with another contact 4 analogous to contact 1, but which is influenced if the current in the anode circuit of the tube falls rapidly. This contact may further be connected to another lamp $L_{11}$ and relay $RE_6$ analogous to $L_{10}$ and $RE_5$ respectively. As should be clear from Fig. 4, the motor and the tube, $E_1$, together with the component coupling elements, form a unit—an antenna unit—in themselves, while the other details, of which a number are common to a number of antennae units, may be connected to a so-called central office apparatus over a line L. The relays $RE_1$, $RE_5$, $RE_6$ and the lamps $L_{10}$ and $L_{11}$ are thus the indicating devices in Fig. 4 but the regulating device comprises the contacts 2 and 3 on the relay $RE_1$ and the motor M. Therefore, the regulating device is operated by current from the indicating device.

For rapid adjustment of the condenser $C_1$, continuous uninterrupted A. C. current supply is connected as the current supply V₃.

The operating device (K₁ Fig. 1) for the rapid adjustment of the regulating device should naturally be so placed that it cannot be operated in an unauthorized manner without an indicating signal being given. For this reason, the operating device is placed either in the guard-room, or is connected in by means of a code lock or such like, to which unauthorized persons cannot obtain access. Such a code lock may be suitably provided with contacts which, in one position disconnect the signal device, and in the other position connect up a relay which causes the rapid adjustment to start.

We claim:

1. In a detector system, in combination a bridge circuit having a guard antenna connected to one arm and defining a capacitance in said one arm and having a variable capacitor connected in another arm, a source of high frequency oscillatory current connected to said bridge circuit, an electrical indicating device coupled to said bridge circuit and operating in response to relatively rapid impedance variations in said one arm of the bridge circuit to indicate an intruder, said variable capacitor being adjustable to provide a predetermined normal value of current in the indicating device, regulating means coupled to the variable capacitor and operating in response to relatively slow changes in the magnitude of the current in said indicating device to regulate the variable capacitor to return the current to said predetermined normal value, a time delay element connected to said regulating means, and means whereby said time delay element retards the action of the regulating means.

2. The structure of claim 1, and switch means connected in circuit with the time delay element for at times disconnecting said time delay element to prevent retardation of the regulating means.

3. The structure of claim 1, and wherein said regulating means comprises an impulse motor having a movable magnetic armature, a plurality of electromagnetic stationary poles, a pulsing device, and means for selectively, sequentially connecting said pulsing device to said poles in accordance with the direction of the current variation in the indicating device.

4. The structure of claim 1, and wherein said source of high frequency current comprises a transistor.

5. The structure of claim 1, and wherein said source of high frequency current comprises an amplifier element with one control electrode, one current-collecting electrode and one electron-emissive electrode, the control electrode being coupled to one terminal of the variable capacitor and to the antenna, the other arms of the bridge circuit comprising a tapped inductance whose tap is connected to the electron-emissive electrode, one terminal of the inductance being grounded and the remaining terminal of said inductance being connected to the remaining terminal of the variable capacitor, the indicating device being connected to the current-collecting electrode.

PER HARRY ELIAS CLAESSON.
KARL LENNART JOHANSSON.

References Cited in the file of this patent

UNITED STATES PATENTS

| Number | Name | Date |
|---|---|---|
| 2,112,826 | Cook | Apr. 5, 1938 |
| 2,421,771 | Browning | June 10, 1947 |